United States Patent [19]
Miyamoto et al.

[11] 4,045,763
[45] Aug. 30, 1977

[54] SEALED THERMOSTATIC HEATER

[75] Inventors: Mamoru Miyamoto, Neyagawa; Kazuo Ishikawa, Kadoma, both of Japan

[73] Assignee: Matsushita Electric Industrial Co., Ltd., Osaka, Japan

[21] Appl. No.: 633,230

[22] Filed: Nov. 19, 1975

[30] Foreign Application Priority Data
Nov. 20, 1974 Japan .................... 49-141083[U]
Jan. 20, 1975 Japan .................... 50-9624[U]

[51] Int. Cl.² .......................................... H01C 7/02
[52] U.S. Cl. .................................. 338/23; 219/504; 338/22 R

[58] Field of Search .................... 338/22-25; 219/504, 505; 73/362 AR, 362 SC

[56] References Cited
U.S. PATENT DOCUMENTS
1,279,321  9/1918  Gardner .................. 219/504 X
3,023,295  2/1962  Johnson .................. 219/244 X Primary Examiner—C. L. Albritton
Attorney, Agent, or Firm—Stevens, Davis, Miller & Mosher

[57] ABSTRACT

A sealed thermostatic heater for use in a hair curling iron which uses a positive temperature coefficient (PTC) thermistor as a heat source together with a wire-wound heater, coated heater or ceramic heater.

4 Claims, 10 Drawing Figures

SEALED THERMOSTATIC HEATER

The present invention relates to a sealed thermostatic heater which utilizes the resistance-temperature characteristic of a PTC (positive temperature coefficient) thermistor, and more particularly to such a sealed thermostatic heater suitable for use in a hair curling iron.

It is a first object of the present invention to provide a novel sealed thermostatic heater having a temperature rise characteristic which requires a short time to reach a constant temperature after power is turned on.

It is a second object of the present invention to provide a novel sealed thermostatic heater which has a small temperature difference among points on an outer peripheral surface of the heater.

The above and other objects, features and advantages of the present invention will become apparent from the following detailed description of the preferred embodiment of the invention when taken in conjunction with the accompanying drawings, in which.

Figure 1:
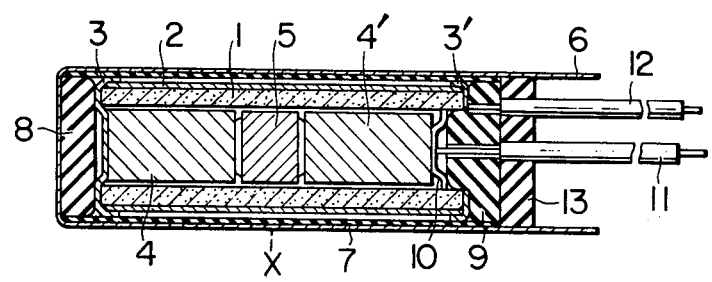
FIG. 1 is a sectional view of a sealed thermostatic heater in accordance with one embodiment of the present invention.
Figure 2:
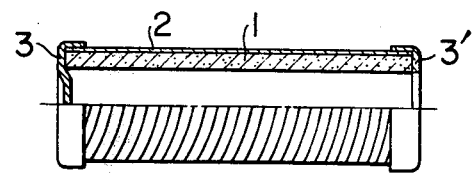
FIG. 2 is a fragmentary sectional view of a cylindrical heater to be used in the above thermostatic heater.
Figure 3:
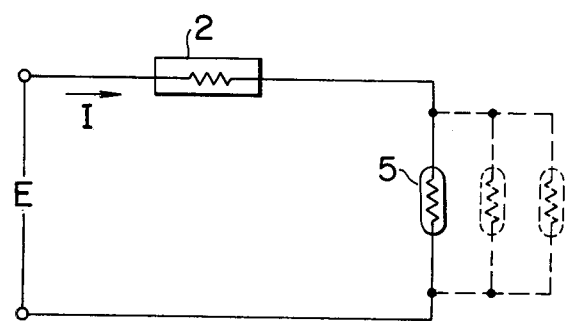
FIG. 3 is a circuit diagram of the thermostatic heater.

Referring to FIG. 1, a cylindrical ceramic tube 1 as shown in FIG. 2 has a cylindrical heater 2 comprising a wire-wound heater or coated heater mounted on an outer peripheral surface of the ceramic tube 1. Terminal 3, 3' are attached to opposite ends of the cylindrical ceramic tube 1, one of the terminal plates, 3', being formed in a ring shape. Cylindrical, metallic radiators 4, 4' and a PTC thermistor 5 are housed in a hole formed in the ceramic tube 1 such that the PTC thermistor 5 is held by the metallic radiators 4, 4' therebetween. A metal tube 6 having one end closed, a tubular insulator 7 housed in the tube 6, and insulating circular plate 8, an insulating plate 9 having a reduced section which is adapted to be inserted into the ceramic tube 1 and bores through which lead wires extend, and a resilient metal terminal 10 are provided, the metallic radiators 4, 4' and the PTC thermistor 5 being urged toward each other by the resilient force of the metal terminal 10. A lead wire 11 is connected to the metal terminal 10 and a lead wire 12 is connected to the terminal plate 3', the lead wires 11 and 12 being connected to a power supply (not shown). As insulative sealing material 13 closes the opening of the metal tube 6. FIG. 3 shows the electrical circuit of the above sealed thermostatic heater in which the heater 2 and the PTC thermistor 5 are connected in series.

While one thermistor 5 is housed in the ceramic tube 1 in the above embodiment, a plurality of PTC thermistors may be housed in the ceramic tube 1 and a plurality of PTC thermistors may be connected in parallel as shown in FIG. 3.

Figure 4:
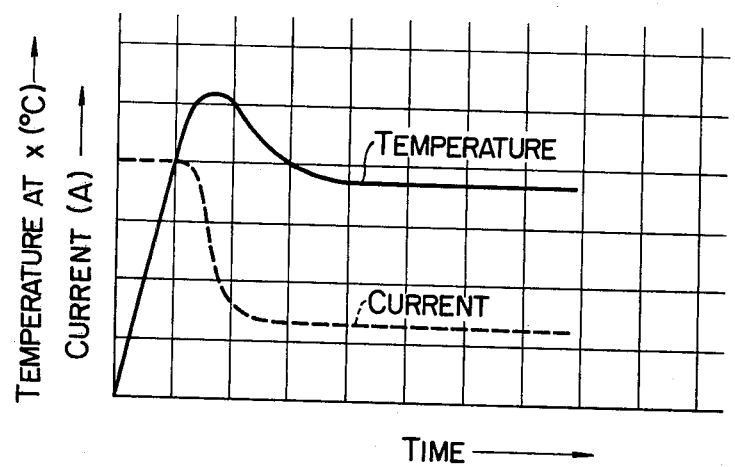
FIG. 4 shows a temperature rise characteristic curve at a point X of the thermostatic heater.
Figure 5:
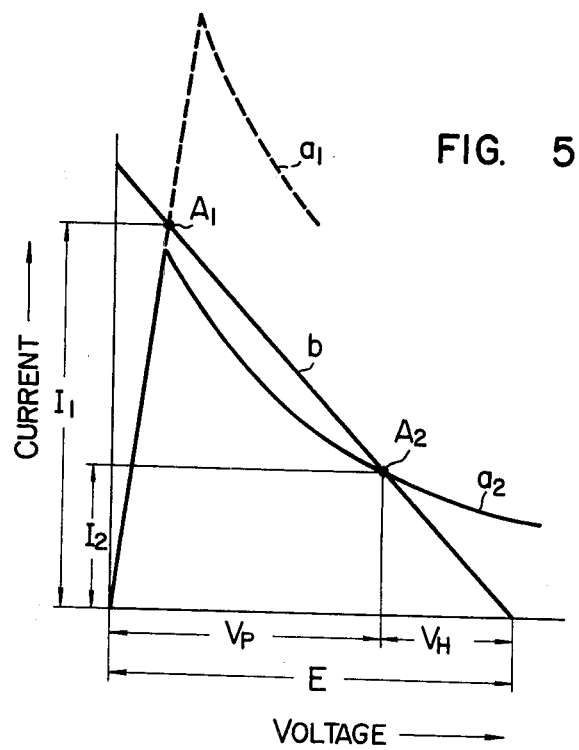
FIG. 5 shows an operational characteristic curve of the thermostatic heater.

FIGS. 4 and 5 show an operation characteristic of the thermostatic heater of the present invention. Upon power being turned on, the resistance of the PTC thermistor is so low that most of the power supply voltage E is applied to the cylindrical heater 2. As a result, the heater 2 operates at a point $A_1$ in FIG. 5 so that the heater 2 generates heat and the surface temperature of the tube 6 rapidly rises. Thereafter, when the PTC thermistor 5 reaches a predetermined temperature, the resistance thereof suddenly increases, attenuating the current to stabilize itself at a fixed temperature. That is, it stabilizes at a point $A_2$ in FIG. 5. In FIG. 5, the curve $a_1$ shows the initial current-voltage characteristic curve of the PTC thermistor 5, the curve $a_2$ shows the stabilized current-voltage characteristic curve of the PTC thermistor 5, and the curve $b$ shows the load curve of the cylindrical heater 2.

With the sealed thermistor heater of the above construction in accordances with the present invention, the following advantages are presented.

1. The surface temperature rise rate is very fast. For example, for a cylindrical heater (outer diameter 16 mm, length 60 mm) having a resistance of 250 Ω and a PTC thermistor (outer diameter 10 mm, thickness 4 mm) having a resistance of 15 Ω at 25° C and a Curie point of 230° C at which the resistance thereof suddenly increases, the temperature at the point X (see FIG. 1) reached 200° C one and a half minutes after the power is turned on with an applied voltage of 100 V A.C., and showed a maximum temperature of 260° C in 2.6 minutes, and thereafter the temperature fell and stabilized at 192° C after 4 minutes. The initial current was 330 mA and the stabilized current was 143 mA. As seen from the above experimental result, the temperature rise characteristic on the outer peripheral surface of the thermostatic heater has been remarkably improved.

2. The unevenness in the surface temperature is small. Since the PTC thermistor self-heats and the heat generated thereby is effectively transmitted to the opposite ends of the heater, the unevenness in temperature is very small. Furthermore, even if the PTC thermistor is small, the allowable power dissipation may be large because of the high heat dissipation effect.

3. High reliability. Since the PTC thermistor is used rather than a bimetal strip switch, the contactless temperature control is attained without using any movable parts. Therefore the reliability is very high. The stability of the connection against heat expansion and contraction is fully insured because it is compressively held by the resilient metal terminal.

4. Inexpensive to manufacture. Since the PTC thermistor may be of circular plate type which is easy to make and may be of small size, the heater can be manufactured at low cost.

Figure 6:
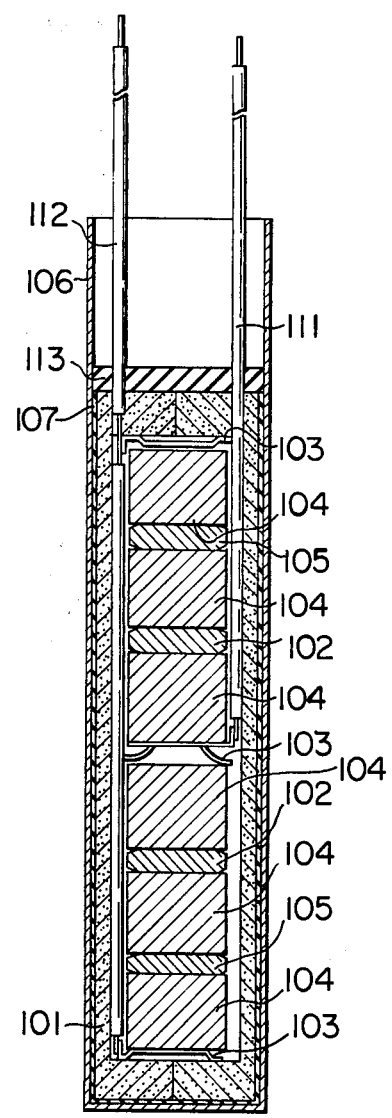
FIG. 6 is a sectional view of a sealed thermostatic heater in accordance with another embodiment of the present invention.
Figure 7:
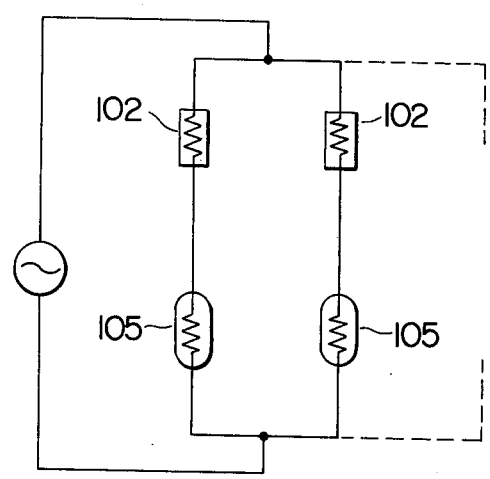
FIG. 7 is an electrical circuit diagram thereof.

FIGS. 6 and 7 shows another embodiment of the present invention. In FIG. 6 a cylindrical, hollow ceramic case 101 can be divided into two parts. Housed in the ceramic case 101 are resilient terminal plates 103, cylindrical metallic radiators 104, circular PTC thermistors 105, and circular ceramic heaters 102, the metallic radiator 104, the PTC thermistor 105, the metallic radiator 104, the ceramic heater 102 and the metallic radiator 104 being held in the order and between the terminal plates 103. Lead wires 111, 112 are connected to the terminal plates 103, and the ceramic case 101 which houses the terminal plates 103, the metallic radiators 104, the PTC thermistors 104, the tubular insulator 107 and the ceramic heaters 102 is housed in a metal tube 106 as shown in FIG. 6. A sealing material 113 is provided.

Figure 8:
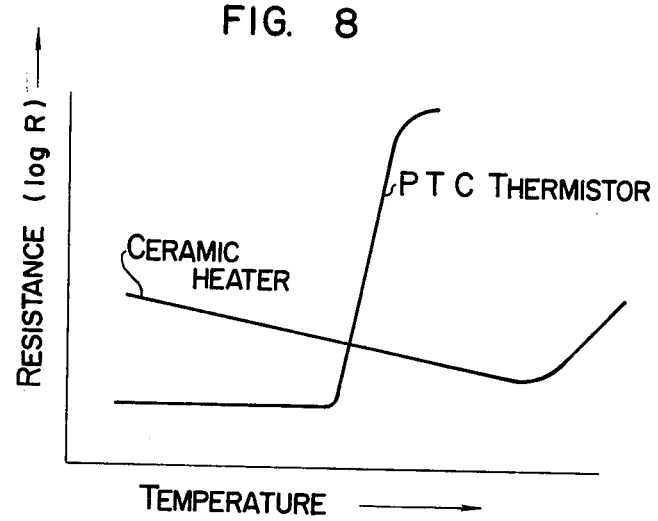
FIG. 8 shows a resistance-temperature curve of the thermostatic heater of FIG. 6.
Figure 9:
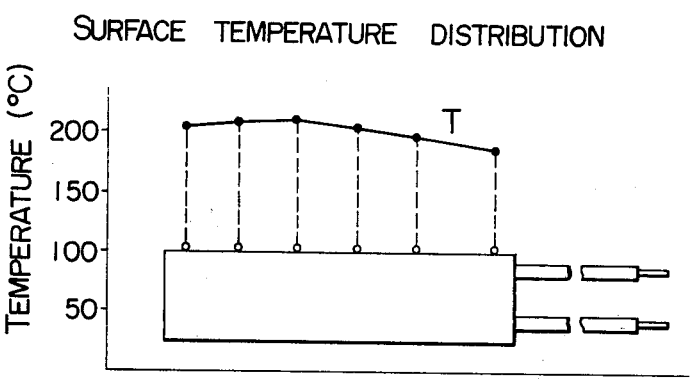
FIG. 9 shows a surface temperature distribution of the thermostatic heater of FIG. 6.

FIG. 7 shows an electrical circuit of the sealed thermostatic heater shown in FIG. 6 in which two sets of series combination of the PTC thermistor 105 and the ceramic heater 102 are connected in parallel. The series combination of the PTC thermistor 105 and the ceramic heater 102 may be one, or a plurality of such combinations may be connected in parallel. As shown in the resistance-temperature characteristic of FIG. 8, the ceramic heater 102 has a higher initial resistance than the PTC thermistor 105 so that upon being turned on the heat is generated primarily by the ceramic heater 102. When the PTC thermistor 105 reaches a predetermined temperature the resistance thereof suddenly increases, attenuating the current to thereby maintain the temperature at a constant value. Further, in its construction, since the metallic radiators 104 are arranged in the ceramic case 101 such that they may contact with the electrode surfaces of the ceramic heaters 102 and the PTC thermistors 105, the entire surface of the metal tube 106 may readily posses uniform temperature distribution, as shown in FIG. 9.

According to the sealed thermostatic heater of the present invention thus constructed, the following advantages are presented;

1. Since the cylindrical metallic radiators are arranged to make contact with the electrodes of the circular ceramic heaters, the temperature rise rate of the metallic tube surface is very fast. Although the heating surface of the ceramic heater per se is very small, since the metallic radiators are in contact with the electrode surfaces, the heat from the ceramic heater is transmitted over a wide area in a short time period and the heating surface of the metallic tube is large resulting in the improvement of the temperature rise characteristic.

2. Since the heat of the ceramic heater is directly received by the PTC thermistor through the metallic radiator, the heater operates stably at the correct temperature. Under the stabilized condition, the ceramic heater and the PTC thermistor generate the heat so that a wide heating surface may be provided through the radiator.

3. In general, the heat generated by the ceramic heater and the PTC thermistor under the stabilized condition changed depending on the unevenness of the characteristics of the respective elements and such unevenness results in the unevenness of the surface temperature distribution (temperature at various points) of the metal tube. By sorting the characteristics of the elements and taking the balance of the positioning of the elements by changing the width of the metallic radiator, the temperature distribution can be readily unified.

4. Since the shapes of the ceramic heater and the PTC thermistor are of conventional circular type they can be very readily manufactured in small size with low cost. Because of the metallic radiator the electrical connection is also easily made and the assembly thereof is simple.

Figure 10:
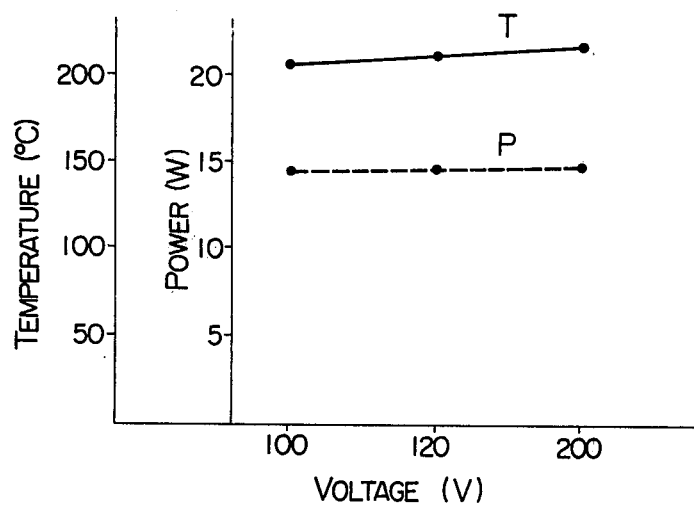
FIG. 10 shows a voltage characteristic of the thermostatic heater of FIG. 6.

5. Since the PTC thermistor is used in the sealed thermostatic heater of the present invention, the power dissipation and the heater temperature remain substantially unchanged even if the power supply voltage changes, as seen from the voltage characteristic curve of FIG. 10.

What is claimed is:

1. A sealed thermostatic heater comprising a ceramic tube having at least one PTC thermistor and at least two metallic radiators housed therein, said PTC thermistor being held by and between said radiators, said ceramic tube being sealed in a metal tube, and PTC thermistor and a heater in said metal tube being electrically connected in series.

2. A sealed thermostatic heater comprising a ceramic tube having at least one PTC thermistor and at least two metallic radiators housed therein and a heater arranged at an outer periphery thereof, said PTC thermistor being held by and between said radiators, said ceramic tube being sealed in a metal tube, said PTC thermistor and said heater being electrically connected in series.

3. A sealed thermostatic heater according to claim 2, wherein a terminal plate fit to one end of said ceramic tube and said heater are electrically connected in series, said radiator, said PTC thermistor and said radiator are inserted, in this order, into said ceramic tube, said radiators and said PTC thermistor are held by and between said terminal plate and a resilient metal terminal forcibly inserted into said ceramic tube, and said heater and said PTC thermistor are connected in series through said terminal plate.

4. A sealed thermostatic heater comprising a ceramic tube having at least one series circuit housed therein, said series circuit including a disc type ceramic heater conductively held between a pair of metallic radiators and a disc type PTC thermistor conductively held between another pair of metallic radiators, said ceramic tube being inserted into a metal tube.

* * * * *